Sept. 15, 1970  W. W. BELL, JR  3,528,491
ABSORPTION HEATING AND COOLING SYSTEM
Filed Dec. 18, 1968
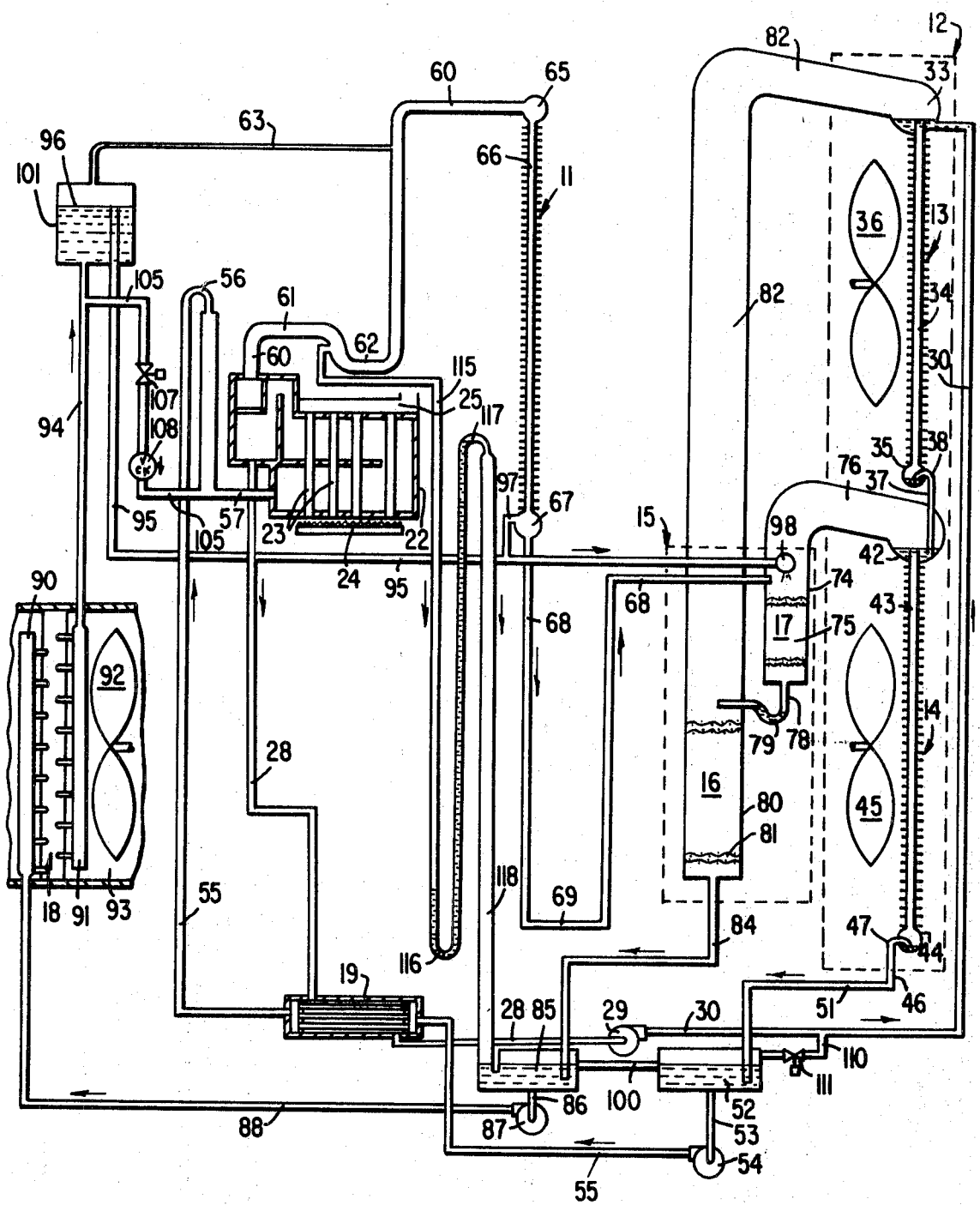
INVENTOR.
WILLIAM W. BELL, JR.
BY Frank N. Decker Jr
ATTORNEY

United States Patent Office 3,528,491
Patented Sept. 15, 1970

---

3,528,491
ABSORPTION HEATING AND COOLING SYSTEM
William W. Bell, Jr., Marcellus, N.Y., assignor to Carrier Corporation, Syracuse, N.Y., a corporation of Delaware
Filed Dec. 18, 1968, Ser. No. 784,729
Int. Cl. F25b 29/00
U.S. Cl. 165—62                                                 9 Claims

ABSTRACT OF THE DISCLOSURE

A heating and cooling system, which in the cooling mode employs an absorption refrigeration cycle to provide cooling and in the heating mode employs a mixture of absorbent solution and refrigerant which is heated in the generator and circulated to a heat exchanger to provide heating. The cooling mode employs a two-stage adiabatic evaporator in combination with a counterflow, two-stage air-cooled absorber. Cooled refrigerant from the evaporator is circulated through a heat exchanger and back to the evaporator for recooling. A cooling passage extends between the heat exchanger and the evaporator, and includes a loop having an elevation above the level of solution desired in the generator during either the heating or cooling modes. An elevated heating passage is connected below the top of the loop to the upstream leg thereof. The other end of the elevated heating passage is connected to the generator and the passage has a mode control valve therein. When the mode control valve is open, refrigerant flows from the heat exchanger to the generator for heating and circulation to the heat exchanger, instead of into the evaporator. A refrigerant reservoir is disposed in the refrigerant passage above the level of the elevated heating passage and arranged so that when the mode control valve is opened, the refrigerant in the reservoir is immediately drained to the generator to raise the liquid level and to dilute the solution therein.

BACKGROUND OF THE INVENTION

Previous absorption refrigeration systems have been known which are capable of being switched into a heating mode of operation to provide heating instead of cooling. Generally, these systems have depended on the condensation process for providing heat to a heating load. The changeover from cooling to heating has usually been accomplished by either a complex valving arrangement or the blowing a seal water loop. Such systems have not been altogether satisfactory, because they have operated at high temperatures during winter heating which promoted corrosive reactions resulting in the production of noncondensible gases. The presence of noncondensible gases in the system inhibits condensation taking place which in turn prevented adequate heating by the system unless measures were taken to purge the system during the heating cycle as well as during the cooling cycle.

These problems have been largely overcome by the system which forms the subject matter of Leonard application Ser. No. 784,750 filed concurrently herewith. In that system, high pressures and temperatures on the heating cycle are not required because the heating cycle does not employ the condensation process. In that system, absorbent solution and refrigerant are mixed to form an antifreeze liquid which is heated to a low temperature in the generator and circulated through a suitable heat exchanger to provide heat when desired.

In copending application Ser. No. 784,750 filed concurrently herewith, there is described an arrangement for automatically initiating the passage of the heated liquid from the generator to the heat exchanger by providing an arrangement of loops and traps which are responsive to the level of liquid in the generator. It is a principal feature of this invention to provide a simple and inexpensive arrangement for quickly and effectively mixing the absorbent solution with refrigerant and for raising the level of liquid in the generator for converting the system from the cooling to the heating mode when desired.

SUMMARY OF THE INVENTION

In accordance with this invention, there is provided an absorption refrigeration system having an adiabatic refrigerant evaporator in which a small portion of refrigerant is evaporated to cool the remaining refrigerant when the system is operating in the cooling mode. The cooled refrigerant is circulated through a heat exchanger to provide cooling to a desired location and the refrigerant is returned to the evaporator for recooling.

A refrigerant passage extending between the heat exchanger and the evaporator for returning refrigerant includes a loop having a vertical elevation above the maximum level desired in the generator during either mode of operation of the system. An elevated heating passage is connected to the upstream leg of the loop below the top thereof. The other end of the elevated heating passage is connected to the generator. A mode control valve is provided in the elevated heating passage.

During cooling mode operation, refrigerant from the heat exchanger passes through the loop and directly back to the evaporator. When it is desired to change from cooling mode to heating mode, the valve in the elevated heating passage is opened causing the refrigerant to bypass the top of loop and be diverted directly to the generator, thereby increasing the volume of refrigerant supplied to the generator and diluting the absorbent solution in the generator with refrigerant.

A refrigerant reservoir may be provided in the cooling passage at an elevation above the level of the elevated heating passage to increase the quantity of refrigerant drained to the generator immediately after opening of the mode control valve. This assures that the level in the generator rises quickly to that desired for heating mode operation and to provide immediate dilution of the solution in the generator upon switching to heating or upon experiencing a power failure.

BRIEF DESCRIPTION OF THE DRAWING

The drawing is a schematic flow diagram, partially in cross section, of a heating and cooling system having heating and cooling passages in accordance with this invention, showing certain liquid levels in the cooling mode of operation.

DESCRIPTION OF THE PREFERRED EMBODIMENT

This invention will be described with respect to a preferred embodiment wherein a two-stage adiabatic refrigerant evaporator and a two-stage air-cooled absorber are employed. However, this invention may be employed in systems having any number of either adiabatic or non-adiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide will be referred to as "strong" solution and a dilute solution of lithium bromide will be referred to as "weak" solution. "Refrigerant" as used herein includes pure water, which may be referred to as "concentrated refrigerant" and refrigerant water having lithium bromide therein which may be referred to as "dilute refrigerant". A heat transfer promoting additive, such as 2-ethyl-n-hexanol, may be added to the absorbent solution.

Referring to the drawing, the system comprises a generator 10, a condenser 11, an absorber 12 having a low pressure stage 13 and a high pressure stage 14, an adiabatic evaporator 15 having a low temperature stage 16 and a high temperature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger.

Generator 10 comprises a shell 22 having a plurality of fire tubes 23 extending therethrough. Fuel burner 24 discharges hot gas through fire tubes 23 to flue gas collector 25. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low pressure vapor header 33 disposed at the top of low pressure absorber stage 13.

Low pressure absorber stage 13 comprises a plurality of vertically disposed finned absorber heat exchange tubes 34 connected at their upper ends by a low pressure vapor header 33 and at their lower ends by a low pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low pressure liquid header 35 is of intermediate concentration. The intermediate solution passes through siphon tube 37 having an upwardly arched portion 38 into high pressure vapor header 42 of high pressure absorber stage 14.

High pressure absorber stage 14 comprises a plurality of finned vertical absorber heat exchange tubes 43 joined at their upper ends by high pressure vapor header 42 and at their lower ends by high pressure liquid header 44. Intermediate absorbent solution overflows the upper open ends of absorber tubes 43 and passes downwardly along the interior surfaces of the arbsorber tubes while refrigerant vapor is being absorbed therein. The heat of the absorption process is rejected from high temperature absorber stage 14 to ambient air passed over the exterior surfaces of absorber tubes 43 by fan 45.

Absorbent solution passing downwardly through absorber tubes 43 further diluted by the absorption of refrigerant vapor therein so that the absorbent solution collected in high pressure liquid header 44 is weak in absorbing power. The weak solution passes from low pressure liquid header 44 through a siphon tube 46 having an upwardly arched portion 47 through weak solution passage 51 into weak solution sump 52. The weak solution then passes from weak solution sump 52 through weak solution pasage 53 to weak solution pump 54. The weak solution is then pumped through weak solution passage 55 and the interior tubes of solution heat exchanger 19 through an upwardly extending weak solution loop 56, and weak solution passage 57 into generator 10 for reconcentration. Weak solution loop 56 has an enlarged cross-section downstream leg which acts as a siphon breaker to prevent siphoning liquid from the generator.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high temperature evaporator stage 17 of adiabatic refrigerant evaporator 15.

High temperature evaporator stage 17 comprises a shell 74 having a suitable packing material 75 therein. A vapor passage 76 extends between high temperature evaporator stage 17 and vapor header 42 of high pressure absorber stage 14. A small quantity of refrigerant is evaporated from refrigerant passing through evaporator stage 17, thereby flashing-cooling the remaining refrigerant. The cooled refrigerant passes from high temperature evaporator stage 17 to low temperature evaporator stage 16 through refrigerant passage 78 having a downwardly extending trap 79.

Low temperature evaporator stage 16 comprises a shell 80 having packing material 81 therein and a refrigerant vapor passage 82 communicating with vapor header 33 of low pressure absorber 13. As in the preceding stage, a small quantity of refrigerant is evaporated in low temperature evaporator stage 16 which results in flash-cooling the remainder of refrigerant passing therethrough. In all, only about one percent of the total refrigerant flowing through adiabatic evaporator 15 need be evaporated to satisfactorily flash-cool the remaining ninety-nine percent. A conventional single or multi-stage evaporator having a heat absorbing heat exchanger 18 included therein may be employed, if desired.

The cold refrigerant then passes from low temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passage 94 including an upwardly extending refrigerant loop 96 formed in a refrigerant reservoir 101, cooling passage 95 and a restricted spray nozzle 98 back to high temperature evaporator stage 17 of adiabatic evaporator 15 for recooling of the refrigerant. Bleed passage 97 is provided to pass a small quantity of the returning liquid refrigerant into liquid condensate header 67. Refrigerant passages 78, 84, 86, 88, 94, 95 together form a cooling passage for circulating refrigerant in the cooling mode.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as explained in Leonard application Ser. No. 784,750.

An elevated heating passage 105 communicates with the upstream leg of passage 94 at a point below the top of loop 96. Loop 96 is formed by reservoir 101 in the illustrated embodiment but the reservoir may be replaced by a loop in passage 94, 95 having a vertical elevation about that of the top of passage 95 in reservoir 101. A mode control valve 107 is disposed in passage 105 which communicates at its other end with generator 10 through passage 57. Another heating passage 110 having a mode control valve 111 therein communicates between discharge of solution passage 30 and absorbent sump 52.

Heating passage 115 is connected to a location in passage 60 associated with generator 10 which contains vapor in the cooling mode and contains liquid in the heating mode. Trap 116 has a vertical height to the top of loop 117 sufficient to balance the pressure difference between generator 10 and absorber 16 when filled with water or solution during the cooling mode. The maximum elevation of loop 117 is below the location in passage 60 to which passage 115 is connected. The enlarged diameter of the downstream leg 118 of loop 117 forms a siphon breaker to prevent heating passage 115 from siphoning liquid from the generator.

Heating passage 105 is connected to the upstream leg of loop 96 in refrigerant passage 94, 95 at an elevation above the location to which heating passage 115 is connected and above the level of loop 61 which communicates heating passage 115 with generator 10. Passage 105 is also above the minimum level of solution which it is desired to maintain in generator 10.

When the system is in the cooling mode of operation, mode control valves 107 and 111 are closed and the liquid levels are approximately as shown in the drawing. Loop 116 is filled with sufficient liquid to balance the pressure difference between generator 10 and refrigerant sump 85 to prevent passage of vapor therebetween.

To switch from the cooling mode of operation to the heating mode, control valves 107 and 111 are opened. Operation of pumps 54 and 29, and fans 36 and 45, is discontinued. Opening of valve 107 causes the liquid refrigerant passing through passage 94 from heat exchanger 18 and the contents of reservoir 101 to be diverted and drained into passage 105 because passage 105 and connecting passage 57 is below the top of loop 96 and reservoir 101, which are also above the top of loop 61. Generator 10 and loops 61 and 62 are immediately flooded with a mixture of refrigerant and absorbent solution. Pump 87 continues to pass refrigerant to the generator as long as valve 107 is open. The liquid level in passage 60 is below the junction of vent line 63 and below the top of refrigerant loop 96 but above the junction of passage 115 and loop 117 with passage 60. Substantially all of the refrigerant and absorbent solution in the system is thereby mixed together to form an antifreeze liquid when the system is in the heating mode. The preferred concentration is between about fifty percent and about thirty percent lithium bromide. Check valve 108 and vent 63 prevent siphoning of liquid from the generator upon shutdown or power failure regardless of the mode of operation at the time.

The passage of refrigerant into the generator raises the level of liquid in the generator above the top of generator and above the top of loop 61 to about the level of passage 105. Raising the level of liquid at the location to which heating passage 115 is connected automatically initiates flow of heated liquid from the generator through passage 115 including trap 116 and loop 117 into sump 85. A major portion of the heated solution (90%) passes upwardly through loop 61 into heating passage 115. The level of the heated solution is above the level of upwardly extending loop 117 and it will flow by gravity through passage 115 through downwardly extending leg 118 into refrigerant sump 85. The heated solution passes from refrigerant sump 85 through passage 86 and is pumped by pump 87 via passage 88 through the heat exchanger 18. Heat exchanger 18 in the heating mode operation operates as a heat rejecting exchanger, thereby warming air passing through duct 93 and cooling the solution. The cooled solution passes from heat exchanger 18 through passages 95, 105 and 57 back to generator 10 for reheating. A minor portion (10%) of the solution heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

Weak solution loop 56 in weak solution passage 55 is disposed below the level of loop 96 and above the level of heating passage 105. Loop 56 prevents passage of heated liquid from generator 10 backwardly through weak solution passage 55, because it is above the maximum level of liquid in generator 10 and passage 60 under all conditions of operation. The enlarged downstream leg of loop 56 prevents the loop from acting as a siphon under all conditions of operation of the system.

Generator 10 is internally provided with a weir 131 which creates an internal loop 130 within shell 22. Weir 131 provides a minimum level of solution in generator 10 under all conditions. Consequently, loop 130 and loop 61 together with heating passage 115 form a generator effluent passage in the heating mode.

When it is desired to terminate heating and return to the cooling mode of operation, mode control valves 107 and 111 are closed. Pumps 54 and 29, and fans 36 and 45 are again energized. Closing of valve 107 terminates direct flow of liquid from heat exchanger 18 to generator 10. Instead, solution is pumped from heat exchanger 18 into reservoir 101, passage 95 and serially through high temperature evaporator 17 and low temperature evaporator 16 of adiabatic evaporator 15. The reduced quantity of solution in generator 10 is again heated to the boiling temperature to concentrate the solution. The level of solution in the generator drops so that vapor passage 60 is free of liquid and contains vapor. Loop 116 is sealed with liquid and prevents vapor from passing therethrough.

The quantity of refrigerant passing through evaporator 15 will increase due to the refrigerant added to the refrigerant circuit from condenser 11, and the level of refrigerant in sump 85 will tend to rise. When the level of refrigerant in sump 85 tends to exceed the level of absorbent solution in sump 52, diluted refrigerant will flow through refrigerant reconcentration and vapor pressure control line 100 into absorbent sump 52 to balance the liquid levels in the two sumps. At absorber ambient temperature above design conditions, diluted refrigerant will continue to be bled from sump 85 into sump 52 until the refrigerant has been substantially concentrated and the absorbent solution has been concentrated to the desired full-load design operating concentration.

If the temperature of air passed over absorber 12 is less than the design temperature, the process of concentrating the absorbent solution and the refrigerant will stop at some intermediate concentration where an equilibrium is reached between absorber capacity and refrigeration demand. From then on, the concentration of absorbent and refrigerant will adjust itself to provide a variable vapor pressure effect which just balances refrigeration load against absorber capacity.

The system described herein provides an inexpensive and effective method for simultaneously quickly diluting absorbent solution in the generator and raising the level of the solution in the generator when it is desired to switch from the heating to the cooling mode of operation. By this means, the system is able to respond rapidly to a heating demand and the danger of solidification or freezing of solution in the system is minimized. Likewise, the arrangement of loops described effectively prevents siphoning of solution from the generator in the event of a power failure or a plant shutdown. The changeover from heating to cooling and back again is effected without the necessity for building up sufficient pressures to blow seal loops or to form condensate traps which would inhibit rapid response to a changed demand for heating or cooling.

While the preferred embodiment of this invention has been illustrated and described, it will be appreciated that the invention may be otherwise embodied within the scope of the following claims.

I claim:
1. A heating and cooling system having a cooling mode of operation and a heating mode of operation;
   (A) said system in the cooling mode of operation comprising a generator for concentrating weak absorbent solution by boiling the weak solution and vaporizing refrigerant therefrom, a condenser for condensing refrigerant vaporized in the generator, an evaporator for evaporating a portion of the refrigerant condensed in the condenser to cool the remainder of the refrigerant, a heat exchanger for passing liquid refrigerant which is cooled in the evaporator in heat exchange relation with a refrigeration load, and an absorber for absorbing refrigerant vapor formed in the evaporator into absorbent solution concentrated in the generator, said system including weak solution passage means for passing weak absorbent solution from the absorber to the generator, strong solution passage means for passing strong absorbent solution from the generator to the absorber, and cooling passage means for passing cooled liquid refrigerant from the evaporator to the heat exchanger and back to the evaporator for recooling;
   (B) said system in the heating mode of operation comprising heating passage means for passing a mixture of absorbent solution and refrigerant from the generator through said heat exchanger in heat exchange relation with a heating load, and returning the mixture to the generator for reheating therein; wherein the improvement comprises:
   (C) said cooling passage means including a refrigerant loop having an upstream leg and a downstream leg in the direction of fluid flow therethrough, said loop having a vertical elevation greater than the minimum level of liquid desired in said generator;
   (D) said heating passage means including an elevated heating passage joining one of the legs of said refrigerant loop at a vertical elevation below the top of said loop and at least as high as the minimum level of liquid desired in said generator, said elevated heating passage extending from said one leg of said refrigerant loop to said generator; and
   (E) mode control valve means in one of said heating and cooling passages for blocking liquid flow therethrough, said mode control valve means permitting flow of liquid from said heat exchanger to said evaporator in the cooling mode of operation, and said valve diverting the liquid flow from said heat exchanger to said generator in the heating mode of operation, whereby the position of said valve means determines the mode of operation of said system.

2. A heating and cooling system as defined in claim 1 wherein:
   (A) said heating passage joins the upstream leg of said refrigerant loop; and
   (B) said mode control valve means is disposed in said heating passage between said refrigerant loop and said generator, whereby liquid is diverted from passing through the loop to the evaporator and is caused to pass through said heating passage to said generator upon opening of said valve.

3. A heating and cooling system as defined in claim 1 wherein:
   (A) said heating passage joins the upstream leg of said refrigerant loop; and
   (B) said mode control valve means is disposed in said heating passage between said refrigerant loop and said generator, whereby fluid is diverted from passing through the loop in the cooling passage and passes to said generator through said heating passage upon opening of said valve, said mode control valve comprising a normally open valve so that said system may operate in the heating mode upon failure of the valve.

4. A heating and cooling system as defined in claim 1 wherein said heating passage means includes an effluent passage communicating with said generator at an elevation below the level that said heating passage joins said refrigerant loop and at least as high as the minimum level desired in said generator; said effluent passage carrying heated liquid passing from said generator to said heat exchanger when the system is in the heating mode of operation.

5. A heating and cooling system as defined in claim 1 including a liquid reservoir in said cooling passage, said liquid reservoir being located at a higher elevation than said elevated heating passage, said liquid reservoir containing a quantity of liquid refrigerant during the cooling mode of operation and said liquid reservoir draining the liquid therein to said generator through said elevated heating passage when the cooling mode operation is terminated.

6. A heating and cooling system as defined in claim 1 including a liquid reservoir disposed in said cooling passage, said refrigerant loop being disposed within said liquid reservoir, said liquid reservoir being located at a higher elevation than said elevated heating passage, said liquid reservoir containing a quantity of liquid refrigerant during the cooling mode of operation and said liquid reservoir draining the liquid therein to said generator through said elevated heating passage when the cooling mode operation is terminated.

7. A heating and cooling system as defined in claim 1 including siphon breaker means associated with the refrigerant loop in said cooling passage for preventing siphoning of liquid from the generator through said loop.

8. A heating and cooling system as defined in claim 1 wherein said weak solution passage means includes a weak solution loop, said weak solution loop having a vertical elevation at least as high as the minimum level of liquid desired in said generator, for maintaining said minimum level of liquid in said generator when said system is inoperative and when said system is operating in the heating mode.

9. A heating and cooling system as defined in claim 1 wherein said weak solution passage means includes a weak solution loop, said weak solution loop having a vertical elevation at least as high as the minimum level of liquid desired in said generator, for maintaining said minimum level of liquid in said generator when said system is inoperative and when said system is operating in the heating mode, and said weak solution loop having siphon breaker means associated therewith for preventing siphoning of liquid from said generator through said weak solution loop.

References Cited
UNITED STATES PATENTS 3,153,441   10/1964   Pippert et al. _____ 165—62 X WILLIAM E. WAYNER, Primary Examiner U.S. Cl. X.R.

62—101, 108